July 2, 1935.  R. LA R. DAVIES ET AL  2,006,883
PORTABLE ARMREST
Filed Sept. 29, 1933
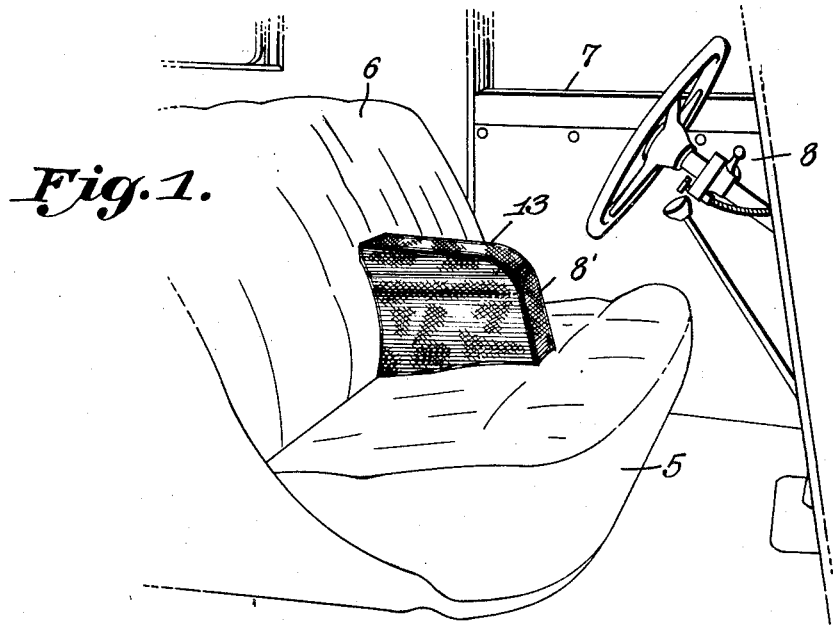
Fig.1.
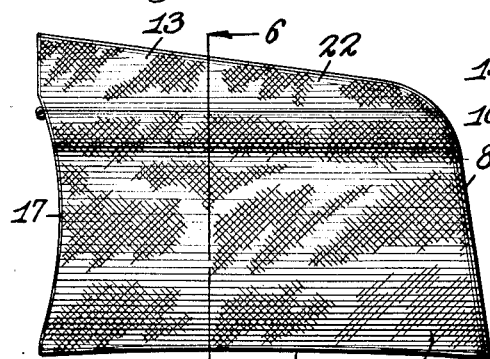
Fig.2.
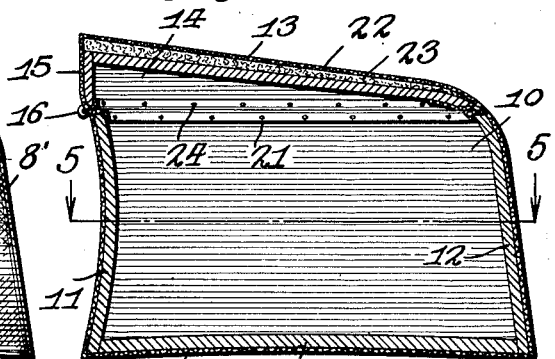
Fig.4.
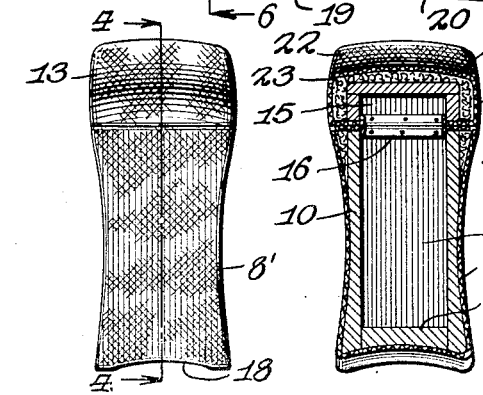
Fig.3.  Fig.6.
Fig.5.
Inventor
Robinson L. Davies
and Carl C. Gehnon
By Ralph Burch
Attorney Patented July 2, 1935

2,006,883

UNITED STATES PATENT OFFICE 2,006,883

PORTABLE ARMREST

Robinson La Rue Davies and Carl Crist Gehron, Williamsport, Pa.

Application September 29, 1933, Serial No. 691,548

2 Claims. (Cl. 155—112)

Our invention relates to a portable arm rest for seats of automobiles and the like.

At the present time, the seating arrangements of automobiles include front and rear seats in the form of a continuous cushion capable of accommodating two or more persons. The rear seat at each end is usually provided with an arm rest formed integral with the body of the automobile and the window sills of the doors adjacent the ends of the front seat serve as arm rests for the occupants of the front seat. In neither of the seats is provision made for an arm rest intermediate the ends of the seats, with the result that an occupant of the seat has nothing on which to rest his inner arm while riding. It is an object of the present invention to provide an arm rest which may be positioned on the seats, wherever desired, to provide a rest for the inner arm of the occupants.

A further object of the invention is to provide a portable arm rest which is held in place by frictional contact with the seat cushion and back.

A still further object of the invention is to provide a portable arm rest in the form of a receptacle having a hinged lid, in which articles may be stored.

Another object of the invention is to provide an article of the above-mentioned character which is simple and durable in construction, efficient in use, attractive in appearance and inexpensive to manufacture.

Other objects and advantages of the invention will be apparent during the course of the following description.

In the accompanying drawing, forming a part of this specification and in which like numerals are employed to designate like parts throughout the same, Fig. 1 is a perspective view of the front seat of an automobile, showing the portable arm rest positioned thereon, Fig. 2 is a side elevation view of the arm rest, Fig. 3 is a rear view of the same, Fig. 4 is a longitudinal sectional view taken on lines 4—4 of Fig. 3, Fig. 5 is a horizontal sectional view taken on lines 5—5 of Fig. 4, and, Fig. 6 is a vertical sectional view taken on lines 6—6 of Fig. 2.

In the drawing, wherein for the purpose of illustration, a preferred embodiment of the invention has been shown, the numeral 5, denotes the front seat cushion of an automobile and 6 the back of the seat, both of which are covered with the usual upholstery. At one end of the seat is shown the window sill 7, in the door 8, which serves as an arm rest for the outer arm of an occupant of the seat. This construction is common in all automobiles of the present type and forms no part of the invention.

Referring more particularly to our invention, the arm rest consists of a box-like structure 8', of substantially rectangular form having a bottom wall 9, side walls 10, rear wall 11 and front wall 12. The top of the box is open and is normally covered by a lid 13 having depending side flanges 14, adapted to rest on the upper edges of the side walls 10 and a depending rear flange 15, which is connected to the upper edge of the rear wall 11, by the hinge 16, so as to permit the lid to swing upwardly. The top of the lid is slightly inclined forwardly and downwardly and at its forward end merges with the upper edge of the front wall 12. The rear wall 11 is curved longitudinally, as at 17, to conform to the contour of the back 6 of the seat and the underside of the bottom wall 9 is curved transversely, as at 18 and longitudinally, as at 19, to fit the seat cushion 5. The outside of the box is covered with fabric upholstery 20, which corresponds to the upholstery of the seat and is folded over the upper edges of the box and secured to the inside, as at 21. The lid 13 is also covered with fabric upholstery 22, beneath which is inserted a suitable padding 23, which extends down the sides of the lid to produce a cushion effect. The edges of the upholstery 22 is folded over the edges of the flanges 14 and 15 and secured to the inside, as at 24.

In use, the arm rest is placed on the seat cushion 5, intermediate the ends of the seat, with the rear wall 11 in frictional contact with the back 6 of the seat and the bottom wall 9 in frictional contact with the seat cushion 5. The rest is held in position by its weight and the frictional contact between the upholstery 20 of the box and the upholstery of the seat cushion and back. The box also serves as a compartment for the storage of tools or other articles, which will add weight to the box, and thus more securely hold the rest in position. When the lid is closed and the rest adjusted in position, the top of the lid will provide a comfortable support for the inner arm of the occupant, thus adding to the enjoyment of riding in automobiles. While the rest is shown constructed with the lid 13, it is obvious, that it may be constructed without the lid and still function as an arm rest.

It is to be understood that the form of our invention herewith shown and described is to be taken as a preferred example of the same and that certain changes in the shape, size and arrangement of the parts may be made without departing from the spirit of the invention or the scope of the subjoined claims.

Having thus described our invention, we claim:—

1. In a portable arm rest for use in combination with the seat of an automobile having a fabric covering, an elongated rectangular body adapted to rest upon the seat in an upright position, said body having its rear wall vertically curved to conform to the contour of the seat back and its bottom wall transversely curved and fabric covering said body adapted to frictionally contact with the covering of said seat whereby the rest is secured in its adjusted position.

2. In a portable arm rest for use in combination with the seat and back cushions of an automobile having a fabric covering, an elongated box-like structure forming a compartment adapted to be positioned transversely of the seat in an upright position, said structure having its rear wall vertically curved to conform to the contour of the back cushion, a hinged lid mounted on top of the compartment forming an arm support when closed and a fabric covering said structure adapted to frictionally contact with the covering of said seat and back cushions, whereby the rest is secured in its adjusted position.

ROBINSON LA RUE DAVIES.
CARL CRIST GEHRON.